United States Patent [19]

Shinjo et al.

[11] Patent Number: 5,453,861
[45] Date of Patent: Sep. 26, 1995

[54] CHIRAL SMECTIC LIQUID CRYSTAL DEVICE AND DISPLAY APPARATUS

[75] Inventors: Kenji Shinjo, Atsugi; Hiroyuki Kitayama, Hiratsuka; Masanobu Asaoka, Yokohama; Masahiro Terada; Syuji Yamada, both of Atsugi; Hiroshi Mizuno, Zama, all of Japan

[73] Assignee: Canon Kabushiki Kaisha, Tokyo, Japan

[21] Appl. No.: 252,535

[22] Filed: Jun. 1, 1994

Related U.S. Application Data

[63] Continuation of Ser. No. 968,687, Oct. 30, 1992, abandoned.

[30] Foreign Application Priority Data

Oct. 30, 1991 [JP] Japan .................. 3-310130
Apr. 1, 1992 [JP] Japan .................. 4-105272

[51] Int. Cl.$^6$ .................. G02F 1/13; G02F 1/1343
[52] U.S. Cl. .................. 359/78; 359/100
[58] Field of Search .................. 359/78, 100

[56] References Cited

U.S. PATENT DOCUMENTS

| | | | |
|---|---|---|---|
| 4,367,924 | 1/1983 | Clark et al. .................. | 350/334 |
| 4,561,726 | 12/1985 | Goodby et al. .................. | 350/341 |
| 4,778,259 | 10/1988 | Kitayama et al. .................. | 350/350 S |
| 4,932,758 | 6/1990 | Hanyu et al. .................. | 359/100 |
| 5,013,137 | 5/1991 | Tsuboyama et al. .................. | 350/333 |
| 5,061,047 | 10/1991 | Bradshaw et al. .................. | 359/100 |
| 5,109,294 | 4/1992 | Hanyu .................. | 359/83 |
| 5,189,536 | 2/1993 | Hanyu et al. .................. | 359/56 |
| 5,200,848 | 4/1993 | Hanyu et al. .................. | 359/100 |
| 5,204,766 | 4/1993 | Taniguchi et al. .................. | 359/100 |
| 5,231,528 | 7/1993 | Escher et al. .................. | 359/100 |

FOREIGN PATENT DOCUMENTS

| | | |
|---|---|---|
| 0444705 | 9/1991 | European Pat. Off. . |
| 4022888 | 2/1991 | Germany . |

OTHER PUBLICATIONS

Koden et al; "The States of . . . with High Pretilt Aligning Film", Japanese Journal of Applied Physics, vol. 30, No. 10B, Oct. 15, 1991, pp. 1823–1825.

Mol. Crys. and Liq. Crys. vol. 34, No. 9 (1977) pp. 211–217.

Meyer et al., "Ferroelectric Liquid Crystals", Journal de Physique Letters, vol. 36, No. 780, 1975, pp. 69–71.

*Primary Examiner*—William L. Sikes
*Assistant Examiner*—Ron Trice
*Attorney, Agent, or Firm*—Fitzpatrick, Cella, Harper & Scinto

[57] ABSTRACT

A liquid crystal device showing improved uniform alignment characteristic and switching characteristic is constituted by a pair of an upper substrate and a lower substrate, and a chiral smectic liquid crystal disposed between the upper and lower substrates. Each of the upper and lower substrates has thereon an electrode for applying a voltage to the liquid crystal and a uniaxial alignment film. The alignment films on the upper and lower substrates are provided with uniaxial alignment axes which cross each other so that the direction of crossing of the uniaxial alignment axes from the lower substrate to the upper substrate is identical to the direction of helical twist in cholesteric phase of the chiral smectic liquid crystal, and the chiral smectic liquid crystal is disposed in such an alignment state that the liquid crystal shows a pretilt angle $\alpha$, a cone angle $H$, an inclination angle $\delta$ of SmC* layer, and an apparent tilt angle $\theta a$ satisfying relationships of: $H < \alpha + \delta$ and $H > \theta a > H/2$. The crossing direction may preferably have a polarity (taken as "positive" in clockwise direction and "negative" in anticlockwise direction) which is the same as the polarity of the spontaneous polarization of the liquid crystal.

3 Claims, 2 Drawing Sheets

C1 ALIGMENT     $\Theta + \delta > \alpha$

C2 ALIGMENT     $\Theta - \delta > \alpha$

CHIRAL SMECTIC LIQUID CRYSTAL DEVICE AND DISPLAY APPARATUS

This application is a continuation of application Ser. No. 07/968,687, filed Oct. 30, 1992, now abandoned.

FIELD OF THE INVENTION AND RELATED ART

This invention relates to a liquid crystal device to be used in a liquid crystal display device or a liquid crystal-optical shutter, etc., particularly a liquid crystal device using of a ferroelectric liquid crystal, more particularly to a liquid crystal device improved in display characteristics through improvement in initial alignment of the liquid crystal molecules, A display device of the type which controls transmission of light in combination with a polarizing device by utilizing the refractive index anisotropy of ferroelectric liquid crystal molecules has been proposed by Clark and Lagerwall (U.S. Pat. No. 4,367,924, etc.). The ferroelectric liquid crystal has generally chiral smectic C phase (SmC*) or H phase (SmH*) of a non-helical structure and, in the SmC* or SmH* phase, shows a property of assuming either one of a first optically stable state and a second optically stable state responding to an electrical field applied thereto and maintaining such a state in the absence of an electrical field, namely histability, and also has a quick responsiveness to the change in electrical field. Thus, it is expected to be utilized in a high speed and memory type display device and particularly to provide a large-area, high-resolution display in view of its excellent function.

For an optical modulating device using a ferroelectric liquid crystal having such histability to exhibit desirable driving characteristics, it is required that the liquid crystal disposed between a pair of substrates should be in such a molecular alignment state that conversion between the above two stable states may occur effectively irrespective of the application of an electrical field.

Further, in a liquid crystal device utilizing birefringence of a liquid crystal, the transmittance under right angle cross nicols is given by the following equation:

$$I/I_0 = \sin^2 4\theta a \sin^2(\Delta nd/\lambda)\pi,$$

wherein $I_0$:incident light intensity,
  I:transmitted light intensity,
  θa:apparent tilt angle,
  Δn:refractive index anisotropy,
  d:thickness of the liquid crystal layer,
  λ:wavelength of the incident light.

The apparent tilt angle θa in the above-mentioned non-helical structure is recognized as a half of an angle between the average molecular axis directions of liquid crystal molecules in a twisted alignment in a first orientation state and a second orientation state. According to the above equation, it is shown that an apparent tilt angle θa of 22.5 degrees provides a maximum transmittance and the apparent tilt angle θa in a non-helical structure for realizing histability should desirably be as close as possible to 22.5 degrees in order to provide a high transmittance and a high contrast.

A method for aligning a ferroelectric liquid crystal should desirably be such that molecular layers each composed of a plurality of molecules of a smectic liquid crystal are aligned uniaxially along their normals, and it is desirable to accomplish such an alignment state by a rubbing treatment which requires only a simple production step.

As an alignment method for a ferroelectric liquid crystal, particularly a chiral smectic liquid crystal in a non-helical structure, one disclosed in U.S. Pat. No. 4,561,726 has been known for example.

However, when a conventional alignment method, particularly one using a polyimide film treated by rubbing, is applied for alignment of a ferroelectric liquid crystal in a non-helical structure exhibiting histability reported by Clark and Lagerwall, the following problems are encountered.

That is, according to our experiments, it has been found that an apparent tilt angle θa (a half of an angle formed between molecular axes at two stable states) in a ferroelectric liquid crystal with a non-helical structure obtained by alignment with an alignment control film of the prior art has become smaller as compared with a a cone angle Ⓗ (the angle Ⓗ is a half of the apex angle of the cone shown in FIG. 3A as described below) in the ferroelectric liquid crystal having a helical structure. Particularly, the apparent tilt angle θa in a ferroelectric liquid crystal with a non-helical structure obtained by alignment with alignment control films of the prior art was found to be generally on the order of 3–8 degrees, and the transmittance at that time was at most about 3 to 5%.

We have studied in order to realize a display device comprising a chiral smectic liquid crystal disposed to have a large apparent tilt angle θa in a non-helical structure and capable of displaying a high contrast image. As a result, we have discovered the following.

A smectic liquid crystal generally has a layer structure and, due to a shrinkage of spacing between layers when it causes a transition from SmA to SmC or SmC*, it assumes a chevron structure as shown in FIG. 2 where the layers 21 are bent at a mid point between a pair of substrates.

We have discovered two alignment states depending on the bending directions as shown in FIG. 2, including a C1 alignment state 22 appearing immediately after transition from a higher temperature phase to SmC* phase and a C2 alignment state 23 which appears in mixture with the C2 alignment state on further cooling. We have further discovered that the above C1→C2 transition does not readily occur when a specific combination of an alignment state and a liquid crystal is used and that the C2 alignment state does not occur at all when a specific liquid crystal is used. It is further discovered that a very high contrast C1 alignment state is formed and the contrast in C2 alignment is low, when a high-pretilt alignment film is used and a relationship of Ⓗ<α+δ is satisfied. As a result, a display with a high white-black contrast is expected to be realized when a high-pretilt alignment film is used and the C1 alignment state is homogeneously formed over the entire display panel.

Referring to FIGS. 3A and 3B, directions in the vicinity of the substrates in the C1 alignment and C2 alignment are disposed on cones 31 shown in FIGS. 3A and 3B, respectively. As is well known, as a result of rubbing, liquid crystal molecules contacting a substrate surface form a pretilt angle α, the direction of which is such that the liquid crystal molecules raise a forward end up (i.e., spaced from the substrate surface) in the direction of the rubbing indicated by an arrow A. From the above, it is required that the following relationships are satisfied among a cone angle Ⓗ, the pretilt angle α and a layer inclination angle δ:
  Ⓗ+δ>α in C1 alignment, and
  Ⓗ−δ>α in C2 alignment.

Accordingly, the condition for preventing the formation of C2 alignment but allowing C1 alignment is Ⓗ−δ<α, that is Ⓗ<α+δ . . . (a).

Further, from simple consideration of a torque acting on a liquid crystal molecule at a boundary surface in switching from one position to the other position under an electric field, the relationship of $\alpha<\delta$ ... (b) is given as a condition for easy switching of such a liquid crystal molecule at the boundary.

Accordingly, in order to form the C1 alignment more stably, it is effective to satisfy the condition (b) in addition to the condition (a).

From further experiments under the conditions of (a) and (b), the apparent tilt angle $\theta a$ is increased from 3–8 degrees obtained when the conditions (a) and (b) are not satisfied to 8–16 degrees when the conditions (a) and (b) are satisfied according to the present invention, and also an empirical relationship of $(H)>\theta a>(H)/2$ ... (c) has been also found.

As described above, it has been clarified that the satisfaction of the conditions (a), (b) and (c) provides a display device capable of displaying a high-contrast image.

However, it has been also found that such C1 alignment states satisfying the conditions (a) and (b) can include a uniform alignment state providing a high contrast between two orientation states and a splay alignment state providing a low contrast between two orientation states. As a result of our study for instabilizing the splay alignment state and stabilizing the uniform alignment state, we have found it effective to adopt an alignment technique that uniaxial alignment axes provided to a pair of substrates forming a liquid crystal device are deviated so as to form a crossing angle of 2–25 degrees. This alignment technique is representatively called cross-rubbing by referring to rubbing as a representative method of providing a uniaxial alignment axis. Similar effect is attained also when oblique evaporation is used for providing uniaxial alignment axes.

However, the improvement in alignment only by cross rubbing is not sufficient but there is still present a case where the splay alignment is stable and a poor switching characteristic is given in the uniform alignment.

Further, as the cross rubbing requires to deviate the uniaxial alignment axes provided to a pair of substrates, the uniaxial aligning characteristic of a liquid crystal can become worse, thus failing to provide homogenous alignment in some cases.

SUMMARY OF THE INVENTION

A generic object of the present invention is to provide a liquid crystal device having solved the above-mentioned problems.

A more specific object of the present invention is to provide a liquid crystal device using a chiral smectic liquid crystal in a uniform alignment state and having a good switching characteristic.

As a result of our further study, we have found that the above-mentioned problems are solved by a specific combination of a helical twist direction in cholesteric phase of a liquid crystal and a crossing direction in the cross rubbing to provide a homogeneous uniaxial alignment, a uniform alignment characteristic and an improved switching characteristic in the uniform alignment, thus arriving at a first aspect of the present invention. As a result of further study, we have also found that the above problem is solved by a specific combination of a polarity of Ps (spontaneous polarization) of a chiral smectic liquid crystal used and a crossing direction in the cross rubbing, thus arriving at a second aspect of the present invention.

More specifically, according to a first aspect of the present invention, there is provided a liquid crystal device, comprising: a pair of an upper substrate and a lower substrate, and a chiral smectic liquid crystal disposed between the upper and lower substrates, each of the upper and lower substrates having thereon an electrode for applying a voltage to the liquid crystal and a uniaxial alignment film; wherein the alignment films on the upper and lower substrates are provided with uniaxial alignment axes which cross each other so that the direction of crossing of the uniaxial alignment axes from the lower substrate to the upper substrate is identical to the direction of helical twist in cholesteric phase of the chiral smectic liquid crystal, and the chiral smectic liquid crystal is disposed in such an alignment state that the liquid crystal shows a pretilt angle $\alpha$, a cone angle $(H)$, an inclination angle $\delta$ of SmC* layer, and an apparent tilt angle $\theta a$ satisfying relationships of: $(H)<\alpha+\delta$ and $(H)>\theta a>(H)/2$.

According to a second aspect of the present invention, there is provided a liquid crystal device, comprising: a pair of an upper substrate and a lower substrate, and a chiral smectic liquid crystal disposed between the upper and lower substrates, each of the upper and lower substrates having thereon an electrode for applying a voltage to the liquid crystal and a uniaxial alignment film; wherein the alignment films on the upper and lower substrates are provided with uniaxial alignment axes which cross each other so that the direction of crossing of the uniaxial alignment axes shows a polarity giving a positive product when multiplied with the polarity of spontaneous polarization of the chiral smectic liquid crystal with the proviso that the polarity of the crossing direction is taken as positive when crossing direction is clockwise and taken as negative when the crossing direction is anti-clockwise, respectively from the lower substrate toward the upper substrate as viewed from above the substrates; and the chiral smectic liquid crystal is disposed in such an alignment state that the liquid crystal shows a pretilt angle $\alpha$, a cone angle $(H)$, an inclination angle $\delta$ of SmC* Layer, and an apparent tilt angle $\theta a$ satisfying relationships of: $(H)<\alpha+\delta$ and $(H)>\theta a>(H)/2$.

It is further found that particularly improved uniform alignment characteristic and switching characteristic in the uniform alignment are provided if the crossing direction (polarity) of the cross rubbing is set to be identical to the polarity of spontaneous polarization (Ps) of the chiral smectic liquid crystal and also identical to the helical twist direction in cholesteric phase of the liquid crystal, and the crossing angle is appropriately selected in relation to the magnitude of Ps of the chiral smectic liquid crystal.

Thus, according to a third aspect of the present invention, there is provided a liquid crystal device, comprising: a pair of an upper substrate and a lower substrate, and a chiral smectic liquid crystal disposed between the upper and lower substrates, each of the upper and lower substrates having thereon an electrode for applying a voltage to the liquid crystal and a uniaxial alignment film: wherein the alignment films on the upper and lower substrates are provided with uniaxial alignment axes which cross each other at a crossing angle $\phi$ so that the direction of crossing of the uniaxial alignment axes shows a polarity giving a positive product when multiplied with the polarity of spontaneous polarization of the chiral smectic liquid crystal with the proviso that the polarity of the crossing direction is taken as positive when crossing direction is clockwise and taken as negative when the crossing direction is anti-clockwise, respectively from the lower substrate toward the upper substrate as viewed from above the substrates; the crossing angle $\phi$ satisfies the relationship of $|\phi|<4$ degrees when $|Ps|<2nC/cm^2$ and $|\phi|\geq 4$ degrees when $|Ps|\geq 2nC/cm^2$, wherein Ps denotes the spontaneous polarization of the chiral smectic liquid crystal at a temperature which is 30° C. below the upper limit temperature of the chiral smectic phase; and the crossing direction from the lower substrate to the upper substrate is identical to the direction of helical twist in cholesteric phase of the chiral smectic liquid crystal: and the chiral smectic liquid crystal is disposed in such an alignment state that the liquid crystal shows a pretilt angle $\alpha$, a cone angle $\text{H}$, an inclination angle $\delta$ of SmC* layer, and an apparent tilt angle $\theta a$ satisfying relationships of: $\text{H}<\alpha+\delta$, $\alpha>\delta$ and $\text{H}>\theta a>\text{H}/2$.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
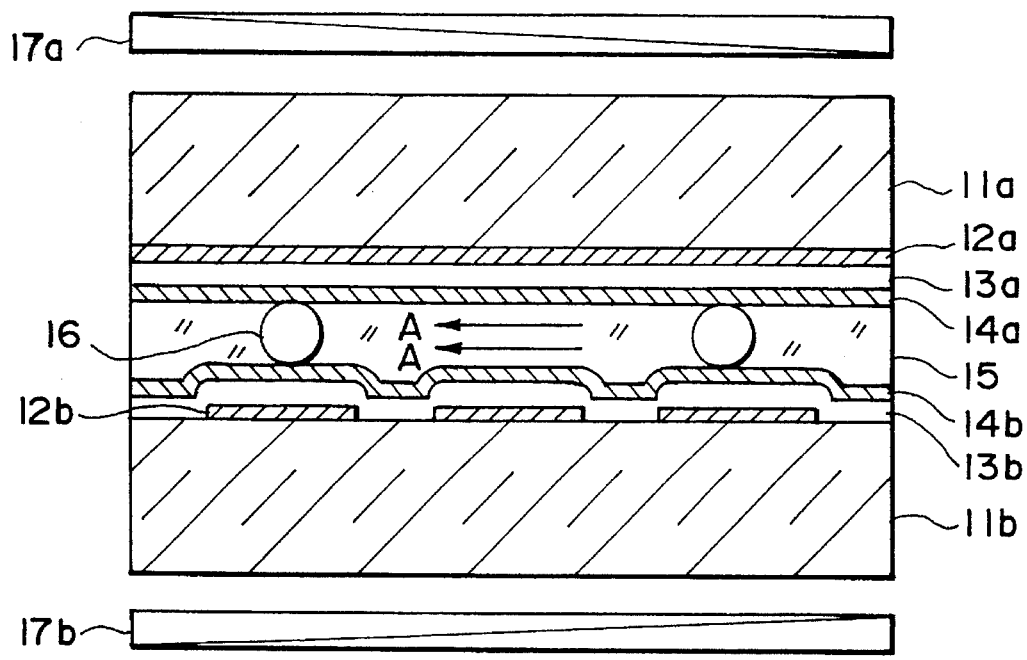
FIG. 1 is a sectional view of an embodiment of the liquid crystal device according to the invention.
Figure 2:
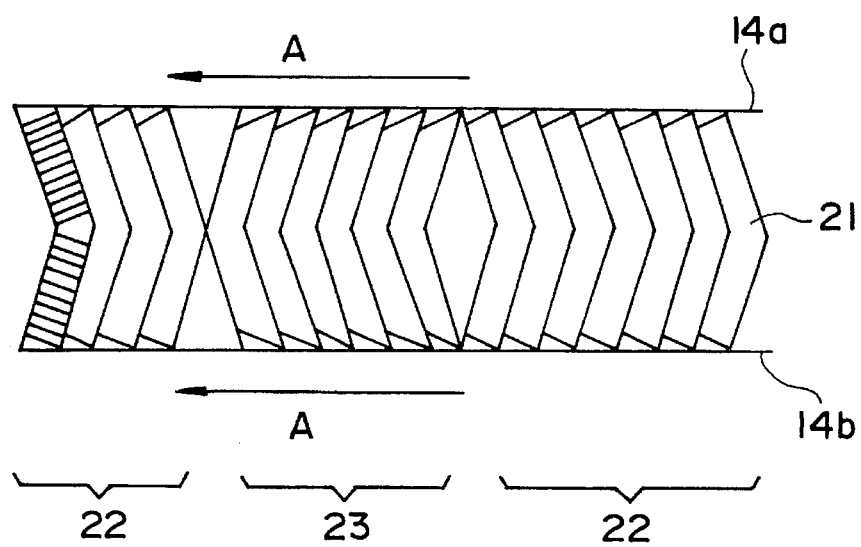
FIG. 2 is an illustration of C1 and C2 alignment states.

The values of cone angle $\text{H}$, layer inclination angle $\delta$, pretilt angle $\alpha$, apparent tilt angle $\theta a$ and cholesteric helical pitch referred to herein are based on values measured according to the following methods.

Measurement of Cone Angle $\text{H}$

An FLC (ferroelectric liquid crystal) device was sandwiched between right angle-cross nicol polarizers and rotated horizontally relative to the polarizers under application of an AC voltage of ±30 V to ±50 V and 100 Hz between the upper and lower substrates of the device while measuring a transmittance through the device by a photomultiplier (available from Hamamatsu Photonics K.K.) to find a first extinct position (a position providing the lowest transmittance) and a second extinct position. A cone angle $\text{H}$ was measured as a half of the angle between the first and second extinct positions.

Measurement of Apparent Tilt Angle $\theta a$

An FLC device sandwiched between right angle cross nicol polarizes was supplied with a single pulse of one polarity exceeding the threshold voltage of the ferroelectric liquid crystal and was then rotated under no electric field horizontally relative to the polarizers to find a first extinction position. Then, the FLC device was supplied with a single pulse of the opposite polarity exceeding the threshold voltage of the ferroelectric liquid crystal and was then rotated under no electric field relative to the polarizers to find a second extinct position. An apparent tilt angle $\theta a$ was measured as a half of the angle between the first and second extinct positions.

Measurement of Layer Inclination Angle $\delta$ $\delta$ was measured by X-ray diffraction analysis by using an X-ray analyzer ("RAD-IIB") under the conditions of 45 kV and 30 mA.

Measurement of Pretilt Angle $\alpha$

The measurement was performed according to the crystal rotation method as described at Jpn. J. Appl. Phys. vol. 19 (1980), No. 10, Short Notes 2013.

More specifically, a pair of substrates rubbed in mutually parallel and opposite directions were applied to each other to form a cell having a cell gap of 20 µm, which was then filled with a liquid crystal mixture assuming SmA phase in the temperature range of 10°–55° C. obtained by mixing 80 wt. % of a ferroelectric liquid crystal ("CS-1014", mfd. by Chisso K.K.) with 20 wt. % of a compound represented by the following formula:

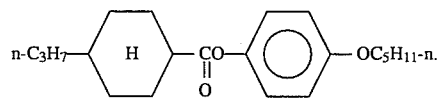

For measurement, the liquid crystal cell was rotated in a plane perpendicular to the pair of substrates and including the aligning treatment axis and, during the rotation, the cell was illuminated with a helium-neon laser beam having a polarization plane forming an angle of 45 degrees with respect to the rotation plane in a direction normal to the rotation plane, whereby the intensity of the transmitted light was measured by a photodiode from the opposite side through a polarizer having a transmission axis parallel to the polarization plane.

An angle $\phi_x$ between a normal to the cell and the incident beam direction for providing the central point of a family of hyperbolic curves in the interference figure thus obtained was substituted in the following equation to find a pretilt angle $\alpha_o$, $$\sin 2\alpha_o = \frac{-2\sin\phi_x}{(n_o+n_e)\sqrt{1-(\sin\phi_x/n_o)^2}}$$

wherein $n_o$ denotes the refractive index of ordinary ray, and $n_e$ denotes the refractive index of extraordinary ray.

Measurement of Cholesteric Helical Pitch

The measurement was performed by using a method of Matsumura, et al "Applied Physics", 43 (1974) 125 based on the Cano's wedge method.

The helical pitch direction was judged by the contact method (Gray etal, "Mol. Cryst., Liq. Cryst., 34 (Lett)", (1977) 211) in cholesteric phase with a liquid crystal having a known helical pitch direction or by a method wherein the sample liquid crystal is mixed with a liquid crystal having a known pitch direction in varying proportions to determine the pitch direction as opposite if the relationship of the pitch length and proportion at a certain proportion is divergent and as the same if the relationship is continuous.

Hereinbelow, the liquid crystal device according to the present invention is described based on embodiments.

FIG. 1 is a sectional view of an embodiment of the liquid crystal device according to the present invention.

Referring to FIG. 1, the liquid crystal device includes a ferroelectric liquid crystal layer 15 sandwiched between a pair of glass substrates 11a and 11b respectively provided with transparent electrodes 12a and 12b, insulating films 13a and 13b, and alignment films 14a and 14b, disposed with a spacing given by spacers 16 to form a cellstructure, which is sandwiched between a pair of polarizers 17a and 17b.

More specifically, two glass substrates 11a and 11b are respectively provided with transparent electrodes 12a and 12b comprising films of, e.g., $In_2O_3$, $SnO_2$, ITO (indium tin oxide), etc., and further coated with insulating films 13a and 13b comprising, e.g., silicon nitride, silicon carbide containing hydrogen, silicon oxide, boron nitride, boron nitride containing hydrogen, cerium oxide, aluminum oxide, zirconium oxide, titanium oxide or magnesium fluoride, and further with alignment films 14a and 14b comprising a film of a polymer, such as polyvinyl alcohol, polyimide, polyamideimide, polyesterimide, polyparaxylylene, polyester, polycarbonate, polyvinyl acetal, polyvinyl chloride, polyvinyl acetate, polystyrene, or cellulosic resin rubbed with gauze or acetate fiber-planted cloth so as to align the liquid crystal in the rubbing direction. The insulating film and alignment film need not be in two layers but can be in a single layer showing both functions.

The glass substrates 11a and 11b are held to leave an arbitrary gap by the spacers 16 which comprise, e.g., silica beads or alumina beads having a prescribed diameter and the periphery of the two substrates may be hermetically sealed by, e.g., an epoxy adhesive. Alternatively, a polymer film or glass fiber can be used as another type of spacer. Between the two substrates thus disposed with a gap from each other, a liquid crystal showing ferroelectricity is disposed to form a ferroelectric liquid crystal layer 15. The ferroelectric liquid crystal layer 15 may be formed in a thickness of generally 0.5–20 µm, preferably 1–5 pm.

EXAMPLE 1

A glass plate provided with a transparent electrode was coated with a film of Ti-Si (1:1) through spin coating and then coated with a 1%-NMP solution of a polyamide acid.("LQ-1802", available from Hitachi Kasei K. K.) by a spinner, followed by baking at 270° C. for 1 hour and rubbing in one direction. The substrate thus treated and another substrate treated in the same manner were applied to each other with a gap of 1.5 µm therebetween so that the rubbing directions crossed at a crossing angle of 6 degrees in an anti-clockwise direction from the lower substrate to the upper substrate to form a blank cell, which was then filled with a ferroelectric liquid crystal mixture comprising a phenylpyrimidine compound as a principal component to form a liquid crystal device. The device (cell) showed a pretilt angle of 16 degrees as measured by the crystal rotation method. The ferroelectric liquid crystal showed a cone angle of 15.4 degrees at room temperature, a layer inclination angle of 10.3 degrees, a Ps of 6.8 $nC/cm^2$ and an anti-clockwise cholesteric pitch of 16 µm at a mid temperature in the cholesteric range.

The liquid crystal device was held at 100° C. for 5 hours and then gradually cooled at a rate of 1° C./min to room temperature, where the device was observed through a microscope to show an initial alignment state which was homogeneously in C1 alignment and in uniform state almost over the entire device area.

The apparent tilt angle was 11.0 degrees between two orientations in the uniform state.

The device caused switching between two orientations in the uniform state at a pulse width of 16 µsec when supplied with rectangular pulses with an amplitude of 24 volts.

COMPARATIVE EXAMPLE 1

A liquid crystal device was prepared by filing a blank cell prepared in quite the same manner as in Example 1 with a ferroelectric liquid crystal comprising principally a phenylpyrimidine compound but showing a cone angle of 14.3 degrees at room temperature, a layer inclination angle of 9.6 degrees, a Ps of 4.3 $nC/cm^2$, a clockwise cholesteric helical pitch of 30 µm at a mid temperature in the cholesteric range.

The liquid crystal device was held at 100° C. for 5 hours and then gradually cooled at a rate of 1° C./min. to room temperature, where the device was observed through a microscope to show an initial alignment state showing a worse uniaxial alignment characteristic and failing to show a homogeneous alignment state, including a portion which assumed a homeotropic alignment state capable of providing only a dark state. As the homogeneous alignment state was lost, clear switching over the entire device area was not attained when the device was supplied with pulses with an amplitude of 24 volts with varying pulse widths (1 µsec to 20 msec).

EXAMPLE 2

A liquid crystal device was prepared by filling a blank cell prepared in the same manner as in Example 1 except that the rubbing directions crossed at a crossing angle of 6 degrees on a clockwise direction, with the same ferroelectric liquid crystal as used in Comparative Example 1.

The liquid crystal device was held at 100° C., gradually cooled and observed through a microscope at room temperature in the same manner as in Example 1. As a result, the liquid crystal showed an initial alignment state in homogeneous C1 alignment including about 90% of splay alignment and the remaining about 10% of uniform alignment. The apparent tilt angle was 10.6 degrees between two orientations in the uniform alignment.

When supplied with rectangular pulses with an amplitude of 24 volts, switching in the uniform alignment was caused at a pulse width of 35 µsec.

COMPARATIVE EXAMPLE 2

A liquid crystal device was prepared by filling a blank cell prepared in the same manner as in Example 2 with the same ferroelectric liquid crystal as in Example 1.

The liquid crystal device was held at 100° C., cooled, and then observed through a microscope in the same manner as in Example 1. As a result, the liquid crystal device gave an initial alignment state showing a worse uniaxial alignment characteristic and failing to show a homogeneous alignment state, including about 80% of a portion which assumed a homeotropic alignment state capable of providing only a dark state. As the homogeneous alignment state was lost, clear switching over the entire device area was not attained when the device was supplied with pulses with an amplitude of 24 volts with varying pulse widths (1 µsec to 20 msec).

As is understood from Examples 1–2 and Comparative Examples 1–2, good alignment characteristic and switching characteristic are attained if the crossing direction of the uniaxial alignment axes coincided with the cholesteric helical twist direction in cholesteric phase of the chiral smectic liquid crystal.

EXAMPLE 3

A glass plate provided with a transparent electrode was coated with a film of Ti-Si (1:1) through spin coating and then coated with a 1%-NMP solution of a polyamide acid ("LQ-1802", available from Hitachi Kasei K. K.) by a spinner, followed by baking at 270° C. for 1 hour and rubbing in one direction. The substrate thus treated and another substrate treated in the same manner were applied to each other with a gap of 1.5 μm therebetween so that the rubbing directions crossed at a crossing angle of 6 degrees in an anti-clockwise (i.e., negative) direction from the lower substrate to the upper substrate to form a blank cell, which was then filled with a ferroelectric liquid crystal mixture comprising a phenylpyrimidine compound as a principal component to form a liquid crystal device. The device (cell) showed a pretilt angle of 14.2 degrees as measured by the crystal rotation method. The ferroelectric liquid crystal showed a cone angle of 14 degrees at room temperature, a layer inclination angle of 9.2 degrees and a negative Ps of 6 nC/cm$^2$.

The liquid crystal device was held at 100° C. for 5 hours and then gradually cooled at a rate of 1° C./min to room temperature, where the device was observed through a microscope to show an initial alignment state which was homogeneously in C1 alignment including about 99.5% of uniform state and the remaining 0.5% of splay state.

The apparent tilt angle was 11.2 degrees between two orientations in the uniform state.

The device caused switching between two orientations in the uniform state at a pulse width of 20 μsec when supplied with rectangular pulses with an amplitude of 24 volts.

COMPARATIVE EXAMPLE 3

A liquid crystal device was prepared by filing a blank cell prepared in the same manner as in Example 3 except that the rubbing directions crossed at a crossing angle of 6 degrees in a clockwise (positive) direction, with the same ferroelectric liquid crystal as used in Example 3.

The liquid crystal device was held at 100° C., gradually cooled and then observed through a microscope at room temperature in the same manner as in Example 3, whereby C1 alignment was retained in the initial alignment state but about 95% was in splay state and the remaining 5% was in uniform state.

The apparent tilt angle was 11.1 degrees between the two states in the uniform alignment. When pulses with an amplitude of 24 volts were applied to the liquid crystal device, switching between the two uniform states became difficult because of the predominance of the splay alignment, thus showing a threshold pulse width of 75 μsec which was substantially longer than in Example 3.

From Example 3 and Comparative Example 3, it is understood that better uniform alignment characteristic and switching characteristic in uniform alignment are attained when the crossing angle between the two substrates is negative in case where the polarity of Ps of the liquid crystal is negative.

EXMAPLE 4

A liquid crystal device was prepared by filling a blank cell prepared in the same manner as in Comparative Example 3 with a ferroelectric liquid crystal mixture comprising a phenylpyrimidine as a principal component and showing a cone angle of 13.5 degrees at room temperature, a layer inclination angle of 10 degrees at room temperature and a positive Ps of 1.0 nC/cm$^2$.

The liquid crystal device was held at 100° C., gradually cooled end observed through a microscope at room temperature in the same manner as in Example 3. As a result, the liquid crystal showed an initial alignment state in homogeneous C1 alignment including about 95% of uniform alignment and the remaining about 5% of splay alignment. The apparent tilt angle was 10.7 degrees between two orientations in the uniform alignment.

When supplied with rectangular pulses with an amplitude of 24 volts, switching in the uniform alignment was caused at a pulse width of 95 μsec.

COMPARATIVE EXAMPLE 4

A liquid crystal device was prepared by filing a blank cell prepared in the same manner as in Example 3 with the same ferroelectric liquid crystal as used in Example 4.

The liquid crystal device was held at 100° C., gradually cooled and then observed through a microscope at room temperature in the same manner as in Example 3, whereby C1 alignment was retained in the initial alignment state but about 90% was in splay state and the remaining 10% was in uniform state.

The apparent tilt angle was 10.7 degrees between the two states in the uniform alignment. When pulses with an amplitude of 24 volts were applied to the liquid crystal device, switching between the two uniform states became difficult because of the predominance of the splay alignment, thus showing a threshold pulse width of 200 μpsec which was substantially longer than in Example 4.

From Example 4 and Comparative Example 4, it is understood that better uniform alignment characteristic and switching characteristic in uniform alignment are attained when the crossing angle between the two substrates is positive in case where the polarity of Ps of the liquid crystal is positive.

From the above Examples 3–4 and Comparative Examples 3–4, it is understood that very good uniform alignment characteristic an switching characteristic in uniform alignment are attained in a liquid crystal device wherein the crossing direction of uniaxial alignment axes of the upper and lower substrate provides a positive product when multiplied with the polarity of spontaneous polarization of the chiral smectic liquid crystal, and the liquid crystal satisfies a relationship of (H)<α+δ and show an apparent tilt angle θa satisfying a relationship of (H)>θa>(H)/2.

Accordingly, the liquid crystal device thus obtained shows a stable uniform alignment characteristic and a good switching characteristic in uniform alignment, thus capable of realizing a high contrast and high quality display.

EXAMPLE 5

A glass plate provided with a transparent electrode was coated with a film of Ti-Si (1:1) through spin coating and then coated with a 1%-NMP solution of a polyamide acid ("LQ-1802", available from Hitachi Kasei K. K.) by a spinner, followed by baking at 270° C. for 1 hour and rubbing in one direction. The substrate thus treated and another substrate treated in the same manner were applied to each other with a gap of 1.5 µm therebetween so that the rubbing directions crossed at a crossing angle of −10 degrees (i.e., in an anti-clockwise direction from the lower substrate to the upper substrate) to form a blank Cell, which was then filled with a ferroelectric liquid crystal mixture comprising a phenylpyrimidine compound as a principal component to form a liquid crystal device. The device (cell) showed a pretilt angle of 17.1 degrees as measured by the crystal rotation method. The ferroelectric liquid crystal showed a cone angle of 15 degrees, a layer inclination angle of 10.3 degrees and a Ps of −5.9 $nC/cm^2$, at a temperature (hereinafter referred to as "Tc−30° C.") which was 30° C. below the upper limit temperature in the chiral smectic range, and an anti-clockwise cholesteric pitch of 19 µm at a mid temperature in the cholesteric range.

The liquid crystal device was held at 100° C. for 5 hours and then gradually cooled at a rate of 1° C./min to room temperature, where the device was observed through a microscope to show an initial alignment state which was homogeneously in C1 alignment and in uniform state almost over the entire device area.

The apparent tilt angle was 10.8 degrees between two orientations in the uniform state.

The device caused switching between two orientations in the uniform state at a pulse width of 15 µsec when supplied with rectangular pulses with an amplitude of 15 volts.

COMPARATIVE EXAMPLE 5

A liquid crystal device was prepared by filling a blank cell prepared in the same manner as in Example 5 except that the crossing angle was changed to −2 degrees, with the same ferroelectric liquid crystal as used in Example 5.

The liquid crystal device was held at 100° C., gradually cooled and then observed through a microscope at room temperature in the same manner as in Example 5, whereby C1 alignment was retained in the initial alignment state but about 70% was in splay state and the remaining 30% was in uniform state.

When pulses with an amplitude of 15 volts were applied to the liquid crystal device, switching between the two uniform states became difficult because of the predominance of the splay alignment, thus showing a threshold pulse width of 31 µsec.

COMPARATIVE EXAMPLES 6–10

Blank cells were prepared in the same manner as in Example 5 except that the crossing angles were changed to −6 degrees, −4 degrees, −2 degrees, 0 degree and +6 degrees, respectively. The respective blank cells were filled with the same ferroelectric liquid crystal as used in Example 5.

The liquid crystal devices were subjected to the same tests as in Example 5. The results are shown in the following Table 1.

TABLE 1

| | Crossing angle | Alignment characteristic (all in C1) | Switching pulse width at 15 volts between two uniform states |
|---|---|---|---|
| Comp. Ex. 6 | −6° | 95% uniform 5% splay | 18 µsec |

TABLE 1-continued

| | Crossing angle | Alignment characteristic (all in C1) | Switching pulse width at 15 volts between two uniform states |
|---|---|---|---|
| 7 | −4° | 80% uniform 20% splay | 23 µsec |
| 8 | −2° | 40% uniform 60% splay | 32 µsec |
| 9 | 0° | 10% uniform 90% splay | 45 µsec |
| 10 | +6° | 100% splay | 70 µsec |

From Example 5 and Comparative Examples 5–10, it is understood that good uniform alignment characteristic and switching characteristic in uniform alignment are attained when the absolute value of the crossing angle is 4 degrees or larger where |Ps| is 5.9 $nC/cm^2$ at Tc−30° C.

EXAMPLE 6

A blank cell was prepared in the same manner as in Comparative Example 5 (i.e., at a crossing angle of −2 degrees) and was filled with a ferroelectric liquid crystal mixture comprising a phenylpyrimidine as a principal component and showing the following properties to provide a liquid crystal device:

Cone angle=14.5 degrees,

Ps (at Tc−35° C.)=−0.9 $nC/cm^2$,

δ=9.8 degrees, and

Ch pitch=38 µm (at Ch mid temperature) in an anti-clockwise direction.

The liquid crystal device was held at 100° C., gradually cooled and then observed through a microscope at room temperature in the same manner as in Example 5. As a result, C1 alignment was retained in the initial alignment state over the entire device area, including uniform state almost over the entire device area. The apparent tilt angle was 10.3 degrees between two uniform states. When pulses with an amplitude of 25 volts were applied to the device, switching between uniform states was caused at a pulse width of 45 µsec.

COMPARATIVE EXAMPLES 11–16

Blank cells were prepared in the same manner as in Example 5 except that the crossing angles were changed to 10 degrees, −6 degrees, −4 degrees, 0 degree, +4 degrees and +6 degrees, respectively. The respective blank cells were filled with the same ferroelectric liquid crystal as used in Example 6.

The liquid crystal devices were subjected to the same tests as in Example 5. The results are shown in the following Table 2.

TABLE 2

| | Crossing angle | Alignment characteristic (all in C1) | Switching pulse width at 25 volts between two uniform states |
|---|---|---|---|
| Comp. Ex. 11 | −10° | 40% uniform 60% splay | 71 µsec |
| 12 | −6° | 50% uniform 50% splay | 65 µsec |
| 13 | −4° | 65% uniform 35% splay | 52 µsec |
| 14 | 0° | 97% uniform 3% splay | 60 µsec |

TABLE 2-continued

| | Crossing angle | Alignment characteristic (all in C1) | Switching pulse width at 25 volts between two uniform states |
|---|---|---|---|
| 15 | +4° | 10% uniform 90% splay | 97 μsec |
| 16 | +6° | 100% splay | 300 μsec |

From Example 6 and Comparative Examples 11–16, it is understood that good uniform alignment characteristic and switching characteristic in uniform alignment are attained when the absolute value of the crossing angle is below 4 degrees where |Ps| is 0.9 nC/cm² at Tc–30° C.

EXAMPLES 7–11

7 Types of blank cells were prepared in a similar manner as in Example 5 except for different crossing angles. Each type of blank cells were filled with liquid crystals having different Ps values and cholesteric pitches to form 5 liquid crystal devices (Examples 7–11).

The respective devices showed uniform alignment characteristics as summarized in Table 3 below.

TABLE 3

| Ex. No. | Ps (Tc–30° C.) (nC/cm²) | Uniform alignment characteristic (%) (each entirely in C1 alignment) at crossing angles | | | | | | | Ch pitch (twist direction) |
|---|---|---|---|---|---|---|---|---|---|
| | | +10° | +6° | +4° | 0° | –4° | –6° | –10° | |
| 7 | +5.5 | 100 | 95 | 80 | 40 | 0 | 0 | 0 | 17 μm (clockwise) |
| 8 | +1.8 | 20 | 40 | 70 | 90 | 0 | 0 | 0 | 29 μm (clockwise) |
| 9 | –10 | 0 | 0 | 0 | 7 | 95 | 100 | 100 | 12 μm (anticlockwise) |
| 10 | –15 | 0 | 0 | 0 | 8 | 85 | 95 | 100 | 8 μm (anticlockwise) |
| 11 | –45 | 0 | 0 | 0 | 5 | 73 | 85 | 97 | 35 μm (anticlockwise) |

As is understood from the above results of Examples 7–11, an improved uniform alignment characteristic is accomplished when the absolute value of the crossing angle is 4 degrees or larger for |Ps|≧2 nC/cm² or smaller than 4 degrees for |Ps|< 2nC/cm², and the crossing direction of the cross rubbing is identical to the cholesteric twist direction of the liquid crystal used.

As has been described hereinabove, the liquid crystal device according to the present invention effectively forms a uniform alignment providing a high contrast and shows a good switching characteristic, thus being able to realize a clear and high-quality display.

What is claimed is:

1. A liquid crystal device, comprising: an upper substrate and a lower substrate, and a chiral smectic liquid crystal disposed between the upper and lower substrates having thereon an electrode for applying a voltage to the liquid crystal and a uniaxial alignment film; wherein the following conditions (a) and (b) are satisfied:

(a) the chiral smectic liquid crystal is in a disposition having a pretilt angle α, a cone angle ⓗ, an inclination angle δ of chiral smectic layer and an apparent tilt angle $\Theta_a$ satisfying the following relations:

[φ] ⓗ<α+δ, and

[φ] ⓗ>$\Theta_a$>ⓗ/2;

(b) axes of said uniaxial alignment films on the upper and lower substrates cross each other at such an angle that the product of value of said angle and the value of spontaneous polarization of chiral smectic liquid crystal is positive, with the proviso that the angle for rotation from said lower substrate alignment axis to said upper substrate alignment axis is taken as negative when the direction of said rotation is counterclockwise, the angle for rotation is taken as positive when said direction of rotation is clockwise.

2. A liquid crystal device according to claim 1, wherein the direction of crossing of said axes of said uniaxial alignment films is identical to the direction of helical twist in cholesteric phase of said chiral smectic liquid crystal.

3. A liquid crystal device, comprising: an upper substrate and a lower substrate, and a chiral smectic liquid crystal disposed between upper and lower substrates having thereon an electrode for applying a voltage to the liquid crystal and a uniaxial alignment film; wherein the following conditions (a)–(c) are satisfied:

(a) axes of said uniaxial alignment films on the upper and lower substrates cross each other at an angle φ, and the product of φ and the spontaneous polarization $P_s$ of chiral smectic liquid crystal is positive, with the proviso that the angle φ for rotation from said lower substrate alignment axis to said upper substrate alignment axis viewed from the upper substrate is taken as negative when the direction of said rotation is counterclockwise, and said angle φ is taken as positive when said direction of rotation is clockwise and the angle φ at a temperature 30° C. below the upper limit of chiral smectic phase satisfies the following relation:

[φ<4 degrees when $P_s$<2nC/cm² or

φ>4 degrees when $P_s$<2nC/cm²];

|φ|<4 deqrees when |$P_s$|<2nC/cm² or

|φ|≧4 degrees when |$P_s$|≧2nC/cm²;

(b) the direction of crossing of said uniaxial alignment axes from the lower substrate to the upper substrate is identical to the direction of helical twist in cholesteric phase of said chiral smectic liquid crystal; and (c) the chiral smectic liquid crystal is in a disposition having a pretilt angle α, a cone angle ⓗ, an inclination angle δ of chiral smectic layer and an apparent tilt angle $\Theta_a$ satisfying the following relations:

[φ] ⓗ<α+δ, and

[φ] ⓗ>$\Theta_a$>ⓗ/2.

\* \* \* \* \*

UNITED STATES PATENT AND TRADEMARK OFFICE
CERTIFICATE OF CORRECTION

PATENT NO. : 5,453,861

DATED : September 26, 1995

INVENTOR : KENJI SHINJO ET AL.

It is certified that errors appear in the above-identified patent and that said Letters Patent is hereby corrected as shown below:

Drawings:

AT SHEET 2

Figure 3A:
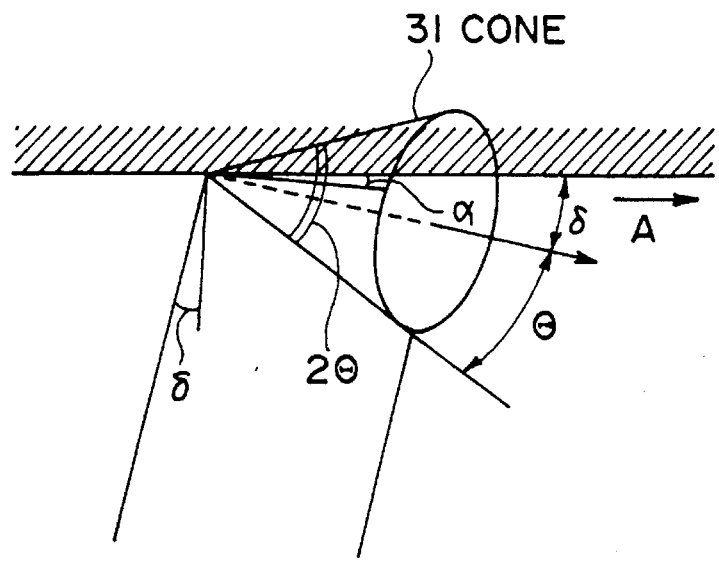
FIGS. 3A and 3B are illustrations of relationship among a cone angle, a pretilt angle and a layer inclination angle in C1 alignment and C2 alignment, respectively.
Figure 3B:
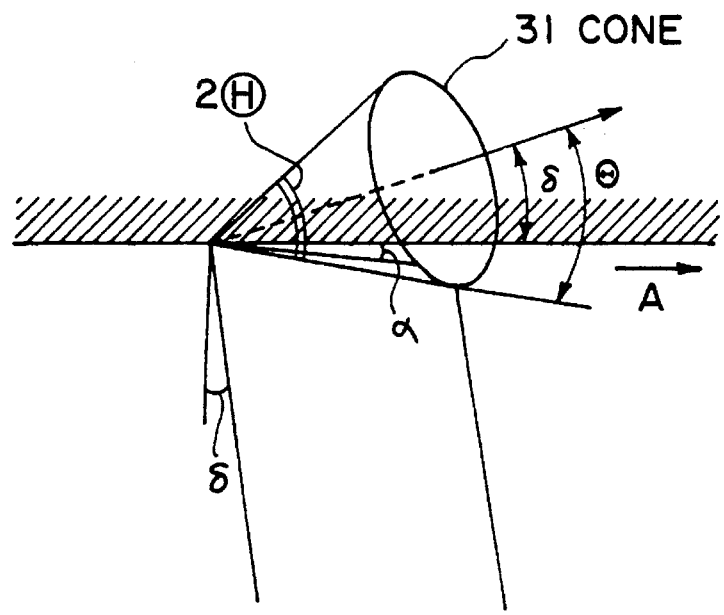

Figure 3A, "ALIGMENT" should read --ALIGNMENT--;

Figure 3B, "ALIGMENT" should read --ALIGNMENT--.

COLUMN 1

Line 28, "histability" should read --bistability--;

Line 34, "histability" should read --bistability--;

Line 59, "histability" should read --bistability--.

COLUMN 4

Line 38, "Layer," should read --layer,--.

COLUMN 5

Line 8, "crystal:" should read --crystal;--.

COLUMN 6

Line 52, "et al" should read --et al.,--

Line 55, "etal," should read --et al.,--.

COLUMN 7

Line 36, "1-5 pm." should read --1-5 $\mu$m.--

Line 43, "acid.("LQ-1802"," should read --acid, ("LQ-1802",--

UNITED STATES PATENT AND TRADEMARK OFFICE
CERTIFICATE OF CORRECTION

PATENT NO. : 5,453,861

DATED : September 26, 1995

INVENTOR : KENJI SHINJO ET AL.

It is certified that errors appear in the above-identified patent and that said Letters Patent is hereby corrected as shown below:

COLUMN 9

Line 22, "ferroelectric, liquid" should read --ferroelectric liquid--;

Line 31, "homogeneously" should read --homogeneous--.

COLUMN 10

Line 10, "end" should read --and--;

Line 12, "3.As" should read --3. As--;

Line 38, "200 μpsec" should read --200 μsec--;

Line 48, "an" should read --and--.

COLUMN 11

Line 6, "Cell," should read --cell,--.

COLUMN 13

Line 64, "[φ] ⓗ < α + δ," should read -- ⓗ < α + δ, --

Line 65, "[φ] ⓗ > θ₁ > ⓗ/2;" should read -- ⓗ > θ₁ > ⓗ/2;--

UNITED STATES PATENT AND TRADEMARK OFFICE
CERTIFICATE OF CORRECTION

PATENT NO. : 5,453,861

DATED : September 26, 1995

INVENTOR : KENJI SHINJO ET AL.

It is certified that errors appear in the above-identified patent and that said Letters Patent is hereby corrected as shown below:

COLUMN 14

Lines 49 and 50 should be deleted;

Line 51, "deqrees" should read --degrees--;

Line 64, "[$\phi$] (H) < $\alpha$ + $\delta$,"

should read -- (H) < $\alpha$ + $\delta$, --

Line 65, "[$\phi$] (H) > $\theta_1$ > (H)/2."

should read -- (H) > $\theta_1$ > (H)/2. --

Signed and Sealed this

Ninth Day of April, 1996

Attest:

BRUCE LEHMAN

*Attesting Officer*     Commissioner of Patents and Trademarks